United States Patent [19]
Hyodo

[11] Patent Number: 4,934,476
[45] Date of Patent: Jun. 19, 1990

[54] VEHICLE SPEED CONTROL SYSTEM

[75] Inventor: Hitoshi Hyodo, Okazaki, Japan

[73] Assignee: Aisin Seiki Kabushikikaisha, Aichi, Japan

[21] Appl. No.: 250,895

[22] Filed: Sep. 29, 1988

[30] Foreign Application Priority Data

Sep. 29, 1987 [JP] Japan .................. 62-246725
Sep. 30, 1987 [JP] Japan .................. 62-246706

[51] Int. Cl.⁵ .............................. B60K 31/00
[52] U.S. Cl. ................... 180/176; 180/177; 364/426.04; 123/360
[58] Field of Search ........... 280/172, 175, 176, 177, 280/178, 179; 364/426.04, 426.05, 565; 371/12; 123/360

[56] References Cited
U.S. PATENT DOCUMENTS

| 4,084,659 | 4/1978 | Abend et al. | 364/426.04 X |
| 4,434,469 | 2/1984 | Suzuki et al. | 364/426.04 |
| 4,629,027 | 12/1986 | Shigenobu | 364/426.04 X |
| 4,754,831 | 7/1988 | Hyodo et al. | 180/176 |

FOREIGN PATENT DOCUMENTS 2754439 6/1979 Fed. Rep. of Germany ...... 180/179
58-128433 10/1983 Japan .
61-271131 12/1986 Japan .

Primary Examiner—Charles A. Marmor
Assistant Examiner—Brian L. Johnson
Attorney, Agent, or Firm—Sughrue, Mion, Zinn, Macpeak & Seas

[57] ABSTRACT

A vehicle speed control system compares current vehicle speed against a target vehicle speed and automatically controls the position of the throttle valve of an engine in accordance with the difference therebetween for reducing the difference. A plurality of brake switches are provided. The system terminates the control of the position when at least one of the switches detects a depression of the brake pedal. If at least one of the switches does not detect the depression of the brake pedal when at least one of the switches detects it, an abnormality signal is generated for blocking commencement of the control of the position of the throttle valve. The abnormality signal is extinguished to enable the commencement of the control when all of the switches detect the depression of the brake pedal.

7 Claims, 12 Drawing Sheets to each control program
selected by S to particular program
selected in accordance with S

VEHICLE SPEED CONTROL SYSTEM

BACKGROUND OF THE INVENTION

The invention relates to a vehicle speed control system which compares a prevailing vehicle speed against a target speed and automatically regulates the attitude of speed controlling means of a drive source in accordance with a difference therebetween.

When a vehicle speed control system of the kind described is applied to an automobile, the current speed of the automobile is compared against a target speed, and the opening of a throttle valve of a carburetor, which supplies a fuel to an engine, is automatically regulated in accordance with a difference therebetween. This is effective to maintain the vehicle speed equal to the target speed, and hence is advantageously utilized to alleviate a driver's effort when running at a constant speed over a relatively long distance as when running on a highway. In fact, there is an increasing number of automobiles on which is mounted a system for effecting a constant speed running control of the kind described.

A driver of an automobile which is provided with a constant speed running system of this kind will initiate a constant speed running control mode well in advance when running at a constant speed over a relatively long time interval is expected according to his driving schedule. However, the termination of such control is not always performed with a margin in time. Many drivers will depress a brake pedal whenever it is urgently required to reduce the speed of the automobile, rather than operating a constant speed running device. When considered in terms of control system, this represents an extreme limit on the feedback, causing a wind-up phenomenon. To prevent this, a constant speed running device is often operable to terminate a constant speed running control mode in response to the depression of the brake pedal. This would be a proper choice in view of the fact that the depression of the brake pedal indicates the driver's desire to change or reduce the vehicle speed.

On the other hand, the depression of a brake pedal is frequently detected by utilizing a switch. Thus, a switch is provided which is opened and closed in response to the operation of the brake pedal so that the depression may be detected by an on/off condition thereof. However, it will be appreciated that the frequency of use of a brake pedal is very high in an automobile while the durability of a switch is not as high as desired. This means that the switch degrades with time, eventually resulting in a failure to detect the depression of the brake pedal. Thus, there is a need to inspect such a switch periodically and to change it as required. A problem then arises that the inspection and exchange of the switch may sometimes take place with an improper period.

To provide one solution to this problem, Japanese Laid-Open Patent Application No. 271,131/1986 discloses a constant speed running system including a pair of switches, each capable of detecting the depression of a brake pedal, so that the constant speed running control may be terminated whenever either one of the switches has detected the depression.

However, the provision of a pair of switches each capable of detecting the depression of a brake pedal has merely increased the length of time until the degradation of the switch results in its loss of functioning to the durable period of either switch, whichever is the longer, but does not overcome the problem of the incapability to detect the depression of the brake pedal which may be caused by an exceptional failure of a switch occurring out of the period. While the probability that such exception occurs for all of the switches may be reduced by providing an increased number of detecting switches to overcome the problem presented above, this would merely complicate the associated mechanism and possibly cause another failure unless the periodic inspection and exchange of the switches are observed in a predetermined manner.

As another solution, Japanese Laid-Open Patent Application No. 128,433/1983 discloses a constant speed running system which terminates a constant speed running control mode when the ratio of the current vehicle speed to a target vehicle speed is equal to or less than a given value. Thus, if a failure of a switch which is provided to detect the depression of a brake pedal occurs, resulting in a failure to detect the depression of a brake pedal, the constant speed running control mode is terminated when the current vehicle speed decreases until the ratio reduces to or below the given value.

It is appreciated that this would enhance the safety of the constant speed running system. However, the driver is only capable of recognizing the result that the constant speed running control mode has been terminated as a result of depressing the brake pedal, but cannot know a failure of the switch which is provided to detect the depression of the brake pedal. Accordingly, he will again utilize the constant speed running control. In such instance, because the constant speed running control mode has been terminated in response to the ratio of the prevailing vehicle speed to the target vehicle speed, the wind-up phenomenon in the control system mentioned above may not be avoided depending upon the magnitude of the deceleration.

In view of the foregoing, it is an object of the invention to provide a vehicle speed control system of enhanced safety and reliability in which a vehicle speed control is enabled only when means commanding the termination of a vehicle speed control, such as a switch detecting the depression of a brake pedal, is functioning properly.

SUMMARY OF THE INVENTION

The above object is accomplished in accordance with a first aspect of the invention by providing a vehicle speed control system comprising first command means for commanding the set up of a vehicle speed control mode; a plurality of second command means individually commanding a termination of the vehicle speed control mode; control means operative to set up the vehicle speed control mode in response to a command from the first command means and to terminate the vehicle speed control mode in response to a command from the second command means, the control means responsive to a difference between a prevailing vehicle speed and a target vehicle speed to regulate automatically the attitude of speed controlling means of a drive source during the time the vehicle speed control mode is set up; and blocking means effective to substantially block the vehicle speed control mode from being set up by the control means in response to a command to terminate the vehicle speed control mode from not all, but at least one of the plurality of second command means and for subsequently terminating the blocking action in response to a command to terminate the vehicle speed control mode from all of the plurality of second command means.

When a plurality of means which command the termination of the vehicle speed control mode are provided, it may be asserted that the possibility that all of them fail simultaneously is substantially removed. In accordance with the invention, the vehicle speed control mode is terminated in response to a command to terminate the vehicle speed control mode from at least one of such means. Accordingly, if any one of the plurality of means which command the termination of the vehicle speed control mode fails, the inability to terminate the mode cannot occur. In such instance, the set-up of the vehicle speed control mode is subsequently inhibited until such failure is remedied, and accordingly, sufficient safety is assured if the termination commanding means has exceptionally failed during the period of inspection and replacement.

In accordance with a second aspect of the invention, there is provided a vehicle speed control system comprising first command means for commanding the set up of a vehicle speed control mode; second command means for commanding the termination of the vehicle speed command mode; control means operative to set up the vehicle speed control mode in response to a command from the first command means and to terminate the vehicle speed control mode in response to a command from the second command means or in response to an increase in the difference between a prevailing vehicle speed and a target vehicle speed, the control means automatically regulating the attitude or position of a speed controlling means of a drive source in accordance with the difference between the prevailing vehicle speed and the target vehicle speed during the time the vehicle speed control mode is effective; and blocking means for substantially blocking the vehicle speed control mode from being set up by the control means after the control means has terminated the vehicle speed control mode in response to an increase in the difference between the prevailing speed and the target speed and for subsequently terminating the blocking action in response to a command to terminate the vehicle speed control mode from the second command means.

As mentioned, when means which command the termination of the vehicle speed control mode fails, the vehicle speed control mode is terminated in response to a difference between the prevailing vehicle speed and the target vehicle speed. In accordance with the invention, in the event the vehicle speed control mode has been terminated in this manner, the vehicle speed control mode is subsequently inhibited from being set up until the failure of the command means is remedied, thus assuring a sufficient safety.

Other objects and features of the invention will become apparent from the following description of embodiments thereof.

DESCRIPTION OF EMBODIMENTS

Figure 1:
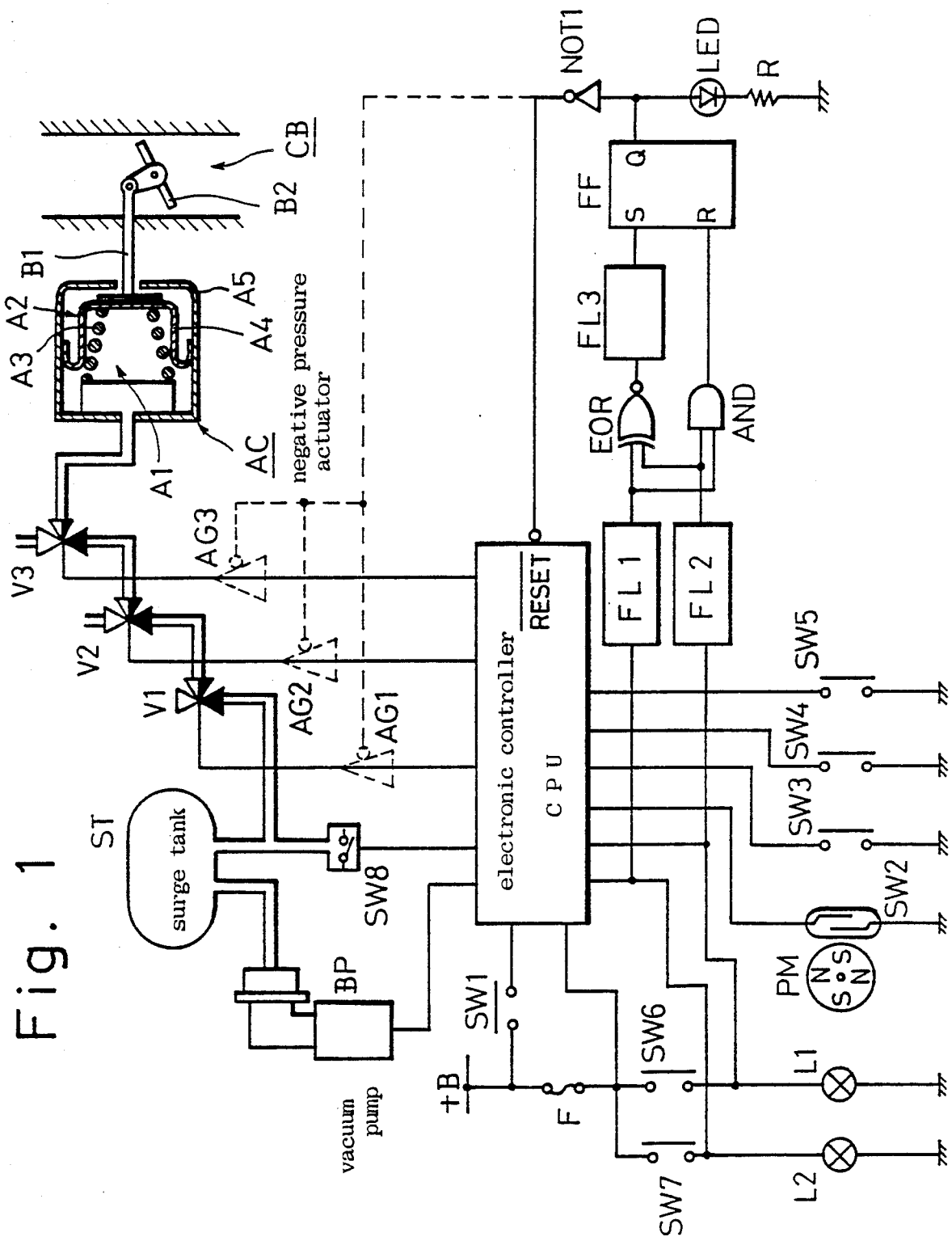
FIG. 1 is a block diamgram of a first embodiment of the invention.

FIG. 1 shows a block diagram of a constant speed running system according to a first embodiment of the invention. The system essentially comprises an electronic controller CPU, a number of switches and electronic circuits which are connected with the electronic controller, a negative pressure actuator AC, a vacuum pump BP and a surge tank ST which operates to produce a pneumatic pressure to serve as a drive source for the actuator.

The electronic controller CPU comprises a single chip microcomputer, to which power is supplied through a power switch SW1. A magnetically sensitive reed switch SW2 is disposed in the vicinity of a permanent magnet PM connected to a speedometer cable (not shown), whereby the contacts of the switch SW2 are opened and closed in response to the rotation of the magnet PM as a vehicle runs, thus delivering a pulse having a frequency which is proportional to a vehicle speed (a vehicle speed signal) to the electronic controller CPU.

A clutch switch SW3 is opened and closed in operative association with a clutch pedal (not shown) of a vehicle, thus detecting the depression of a clutch pedal. A pair of brake switches SW6 and SW7 are operated in association with a brake pedal (not shown) of the vehicle, thus detecting the depression of a brake pedal. These switches also serve as a switch which terminates a constant speed running mode. The brake switches SW6 and SW7 have their one end connected to a power supply through a fuse F and their other end connected to a body of the vehicle serving as an electrical ground through stop lamps L1 and L2, respectively. Voltages across these switches are fed to the controller CPU. Accordingly, if a brake pedal is depressed, the lamps L1 and L2 are lit. In addition, the controller CPU can detect a depression of a brake pedal in the event the fuse F is blown or the filaments of the lamps L1 and L2 are broken.

A set switch SW4 is used to command the storage of a prevailing running speed of a vehicle and to set up a constant speed running mode at the speed which is stored (thus initiating a constant speed running control). A resume switch SW5 is used to command the constant speed running mode to be set up again in the event the constant speed running mode has once been terminated in response to the depression of a brake pedal or clutch pedal. For the convenience of operation by a driver, these switches are disposed in a switch cluster located around a steering wheel.

A pressure switch SW8 is operable to detect the pressure within the surge tank ST which is used to accumulate a negative pressure produced by the vacuum pump BP, and assumes an on condition when such pressure is sufficient, and assumes an off condition otherwise. Its output is fed to the controller CPU. When the switch assumes its off condition, the controller CPU operates to energize a motor associated with the vacuum pump BP to reduce the pressure within the surge tank ST.

An output port of the surge tank ST is connected to an input port of the negative pressure actuator AC through an air flow path. The actuator AC comprises a housing A5, a diaphragm A4 which devides the interior of the housing A5 into a negative pressure chamber A1 and an atmospheric pressure chamber A2, and a coiled compression spring A3 which urges the diaphragm A4 in a direction to expand the negative pressure chamber A1. The actuator is operable to convert a negative pressure produced by the vacuum pump BP into a mechanical reciprocating motion, with its output operating through a rod B1 upon a throttle valve B2 located within a carburetor CB. Specifically, when a negative pressure is introduced into the negative pressure chamber A1 (decompression), the rod B1 is drawn to drive the throttle valve B2 in an opening direction. On the contrary, when a positive pressure is introduced into the negative pressure chamber A1 (compression), the rod B1 is urged by the resilience of the spring A3 to drive the throttle valve B2 in its closing direction.

A switching between the negative or the positive pressure which is introduced into the negative pressure chamber A1 of the actuator AC is achieved by a control valve V1, a vent valve V2 and a release valve V3, all of which are interposed in the air flow path. The controller CPU is effective to energize or deenergive solenoids which drives the respective valves. The valves are of the same dimension, each including a first and a second input port and an output port. A communication is established between the first port and the output port when the associated solenoid is deenergized while a communication is established between the second port and the output port when the solenoid is energized. The function of these valves will be described below.

The control valve V1 has its first input port blocked, its second input port connected to the output port of the surge tank ST and its output port connected to the second input port of the vent valve V2. When the solenoid is energized, this valve delivers a negative pressure from the surge tank ST to the vent valve V2, while it interrupts such pressure when the solenoid is deenergized. The vent valve V2 has its first input port open to the atmosphere, its second input port connected to the output port of the control valve V1 and its output port connected to the second input port of the release valve V3. Thus, when the associated solenoid is energized, it connects the second input port of the release valve V3 to the output port of the control valve V1 while when the solenoid is deenergized, it connects the second input port of the valve V3 to the atmosphere. The release valve V3 has its first input port open to the atmosphere, its second input port connected to the output port of the vent valve V2 and its output port connected to the input port of the negative pressure actuator AC. Thus, when the associated solenoid is energized, it connects the input port of the actuator AC to the output port of the vent valve V2 while when the solenoid is deenergized, the input port of the actuator AC is opened to the atmosphere.

The electronic controller CPU normally energizes the solenoid associated with the release valve V3 to establish a communication between the output port of the vent valve V2 and the input port of the negative pressure actuator AC, but deenergizes the solenoid of the valve V3 to communicate the input port of the actuator AC to the atmosphere to thereby close the throttle valve B2 whenever a proper control is disabled as a result of any abnormality occurring in the control system. Under this condition, the throttle valve B2 ceases to be driven by the actuator AC. In this instance, the valve B2 is driven for opening and closing movement by a linkage, not shown, in response to a depression of an accelerator pedal connected in shunt with the rod B1 of the actuator AC.

During the constant speed running control mode, the electronic controller CPU is operative to compare the current vehicle speed against a target speed, determines the duty cycles with which the solenoids of the control valve V1 and the vent valve V2 are to be energized in accordance with a difference therebetween, and energizes these solenoids accordingly. For example, when the current vehicle speed is higher, a smaller duty cycle is chosen for each of the valves V1 and V2 to increase the length of time during which the negative pressure chamber A1 of the actuator AC is open to the atmospheric pressure, thus driving the throttle valve B2 in its closing direction. Conversely, when the target vehicle speed is higher, a greater duty cycle is chosen to energize the solenoid associated with the valves V1 and V2 to increase the length of time during which a negative pressure is supplied to the negative pressure chamber A1 of the actuator AC, thus driving the throttle valve B2 in its opening direction. The constant speed running control of the kind described is known in itself and has no direct bearing with the present invention, and therefore, will not be described any further.

The electronic controller CPU is provided with a termianl RESET which receives an instruction to stop the control operation. The terminal RESET receives an output from the output terminal Q of the flipflop FF as inverted by NOT circuit NOT1. Thus, when the terminal Q of the flipflop FF delivers H level (high level), it is inverted by NOT circuit NOT1, and the resulting negative edge resets the electronic controller CPU. When reset, the electronic controller CPU initializes its output ports and deenergizes the solenoids of various valves, and ceases its control operation until it is set again (until H level is applied to its terminal RESET). Obviously, the constant speed running mode cannot be established in response to any operation of set switch SW4 or resume switch SW5 in the meantime.

The flipflop FF represents a set-reset type flipflop (R-S flipflop), and is set by a positive edge of an input applied to its set terminal S to establish an H level at its output terminal Q. The flipflop is reset by a positive edge of an input applied to its reset terminal R to establish an L level at its output terminal Q. An output from exclusive OR circuit EOR is applied through a filter FL3 to the set terminal S and an output from AND circuit AND is applied to the reset terminal R of the flipflop FF.

The exclusive OR circuit EOR forms an exclusive logical sum of an on/off signal of the brake switch SW6 from which noises are removed by the filter FL2 and an on/off signal of the brake switch SW7 from which noises are removed by the filter FL1. AND circuit AND forms a logical product of an on/off signal of the brake switch SW6 from which noises are removed by the filter FL2 and an on/off signal of the brake switch SW7 from which noises are removed by the filter FL1. Thus, when the brake switches SW6 and SW7 are both on, AND circuit AND delivers an H level, and when only one of these switches is on, the exclusive OR circuit EOR delivers an H level. In other words, AND circuit AND delivers an H level in response to a depression of the brake pedal and when the switches SW6 and SW7 are functioning properly. By contrast, the exclusive OR circuit EOR delivers an H level in response to any abnormal operation.

When the exclusive OR circuit EOR delivers an H level, this output is effective to set the flipflop FF through the filter FL3, and this condition is maintained until AND circuit AND delivers its H level for the next time. The output terminal Q of the flipflop FF is connected to the terminal RESET of the electronic controller CPU through NOT circuit NOT1 as mentioned previously, whereby the electronic controller CPU interrupts its control operation after the exclusive OR circuit EOR delivers an H level until AND circuit AND delivers an H level. In the meantime, light emitting diode LED connected in series with NOT circuit NOT1 is illuminated, indicating the occurrence of an abnormality.

When the brake switches SW6 and SW7 are operated in response to the depression of the brake pedal, it is possible that the timing when these switches are turned on or off may be displaced from each other even though they are functioning properly. In such instance, the exclusive OR circuit EOR may deliver an H level momentarily, but its output is removed by the filter FL1 and hence cannot set the flipflop FF.

In the arrangement of the first embodiment, the constant speed running control mode is inhibited by interrupting the control operation by the electronic controller CPU whenever any abnormality has occurred with the brake switches SW6 and SW7. However, a modification is indicated in broken lines in FIG. 1. Thus, gates AG1, AG2 and AG3 may be interposed in control lines extending to the solenoids associated with the valves V1, V2 and V3, respectively, thus cancelling the drive of the throttle valve B2 according to the constant speed running control in the event of occurrence of an abnormality, by interrupting control signals. In this modification, an output from NOT circuit NOT1 may be applied as a control input to each of the gates AG1 to AG3, thus interrupting energizing signals applied to the solenoid associated with the valves V1, V2 and V3 from the electronic controller CPU whenever an abnormality occurs with the brake switches SW6 and SW7 and when the flipflop FF is set. Thus, even though the electronic controller CPU establishes the constant speed running mode, control signals are interrupted in the event of occurrence of an abnormality, whereby the throttle valve B2 ceases to be driven, thus inhibiting the constant speed running control in effect.

Figure 2:
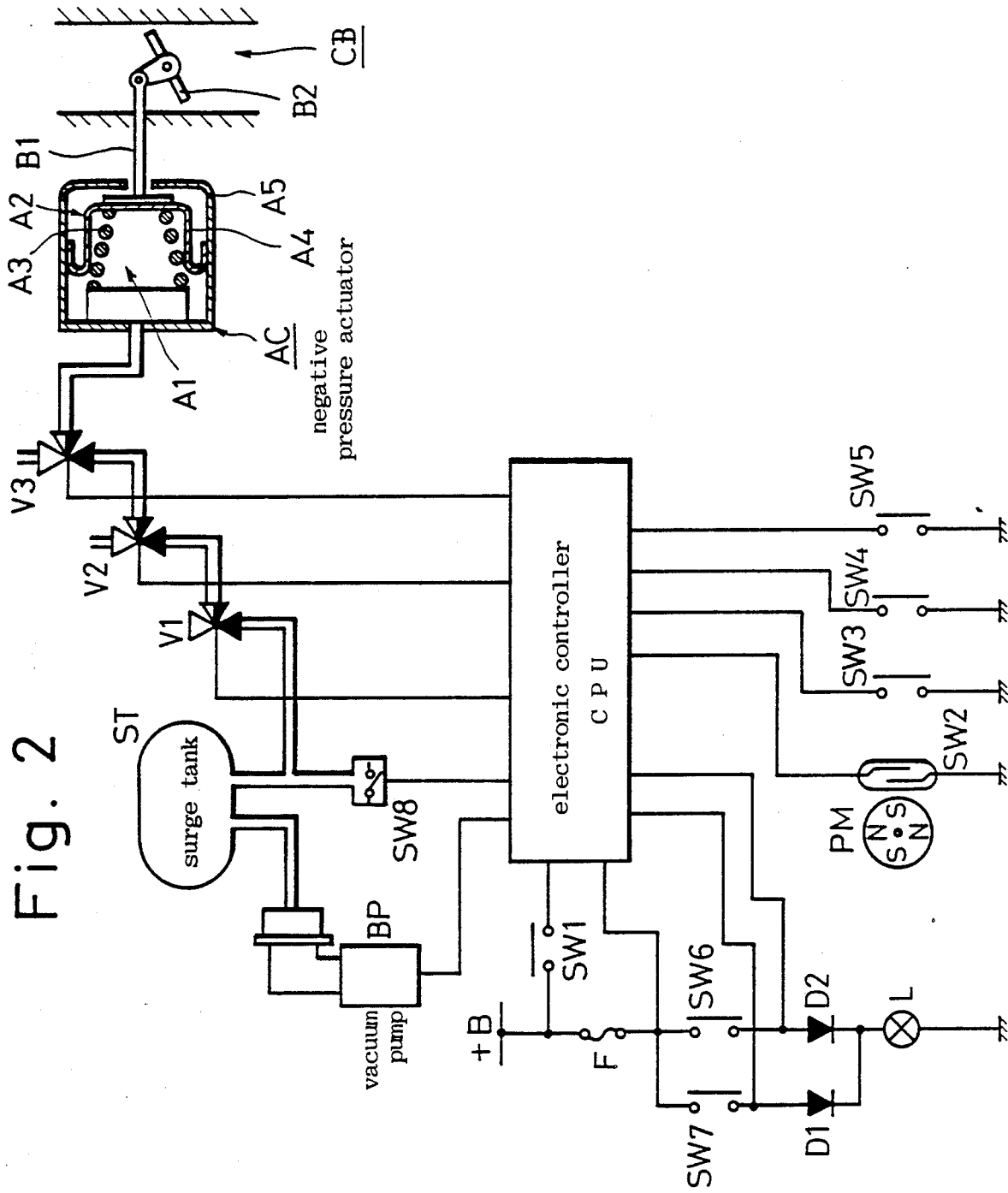
FIG. 2 is a block diagram of a second embodiment of the invention.
Figure 3:
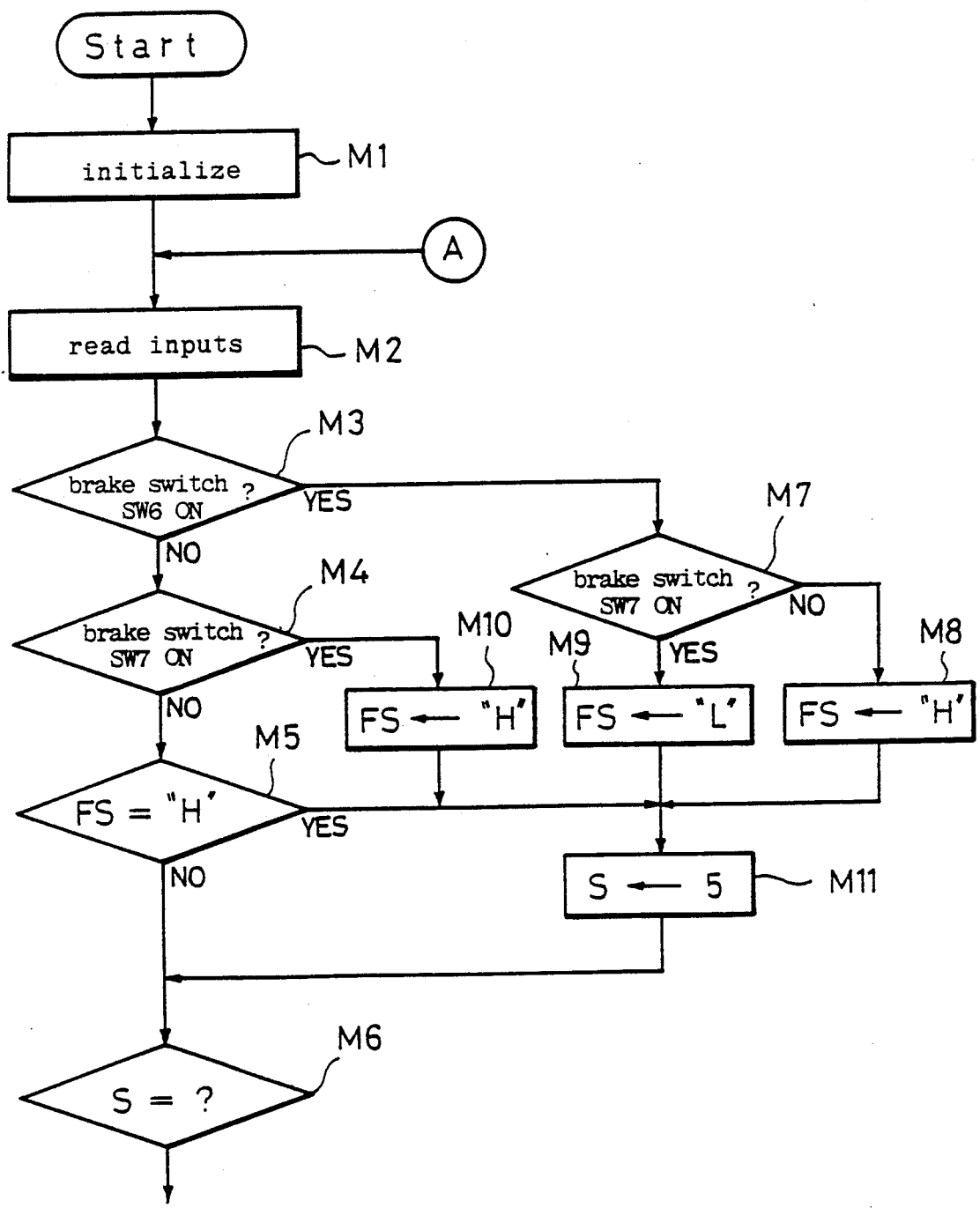
FIGS. 3, 4, 5, 6, 7, 8, 9, 10, 11 and 12 are a series of flow charts illustrating the operation of CPU in an electronic control cirucit shown in FIG. 2
Figure 4:
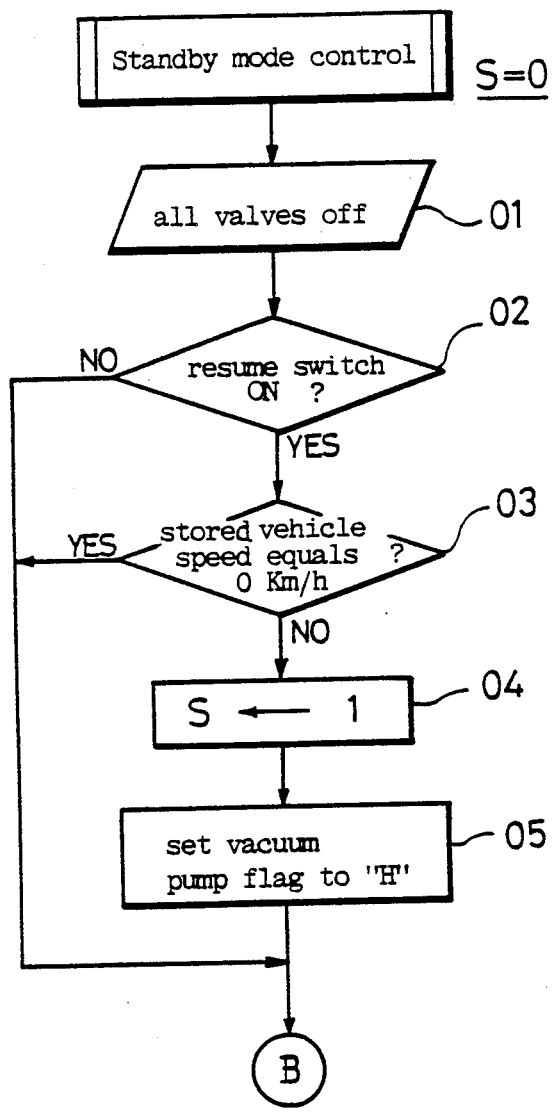
Figure 5:
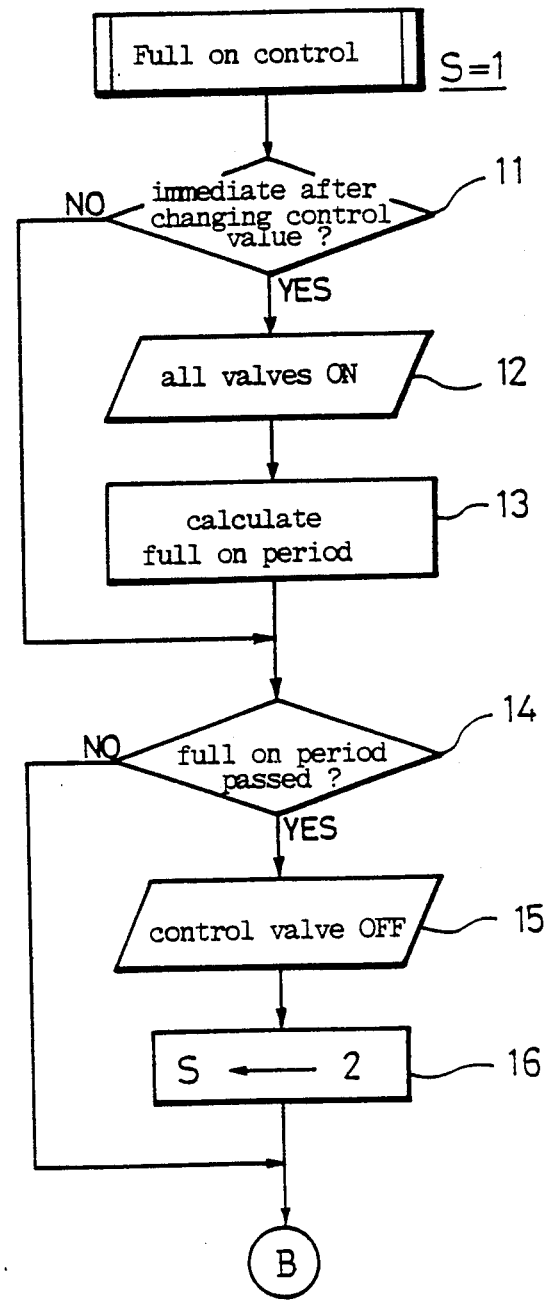
Figure 6:
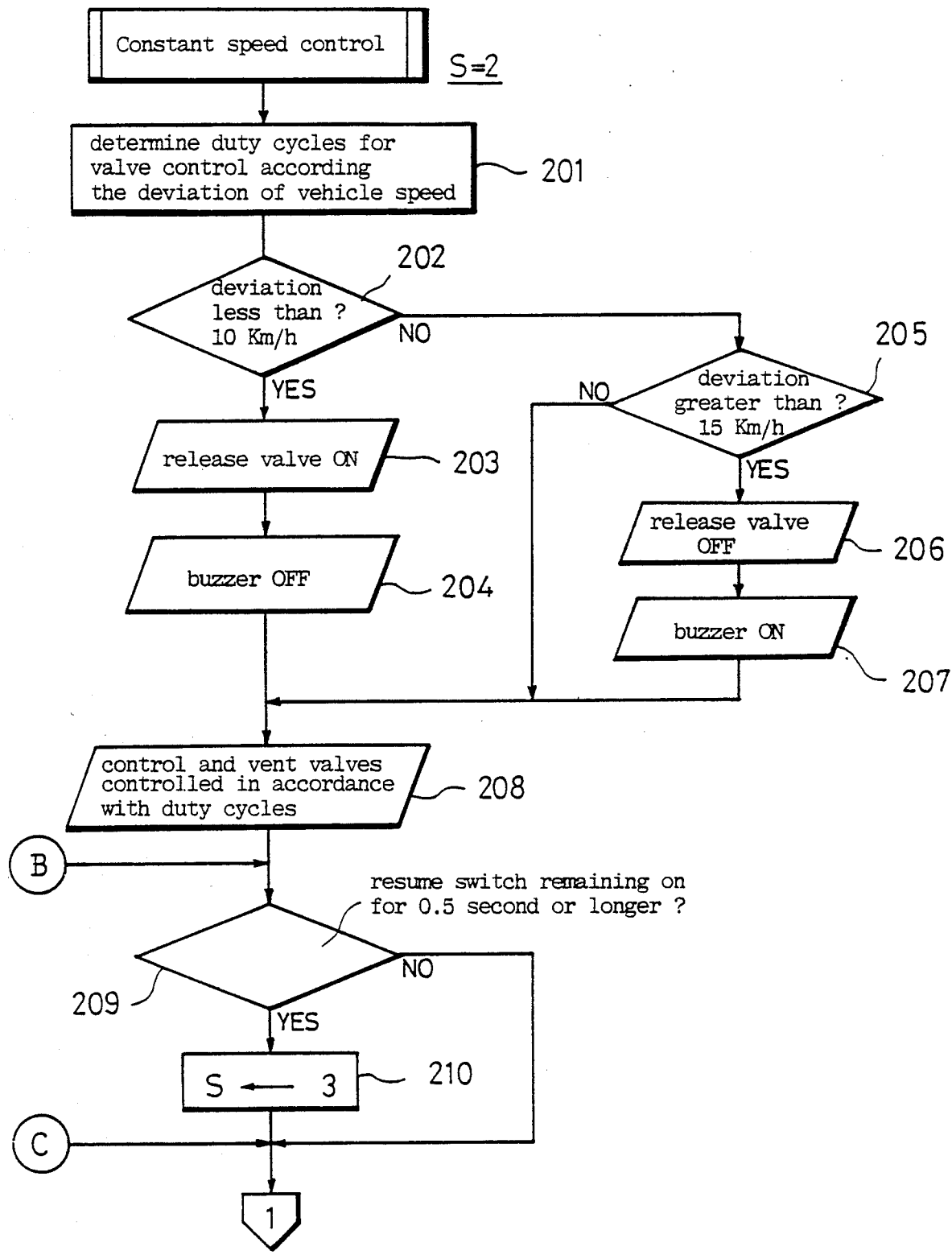
Figure 7:
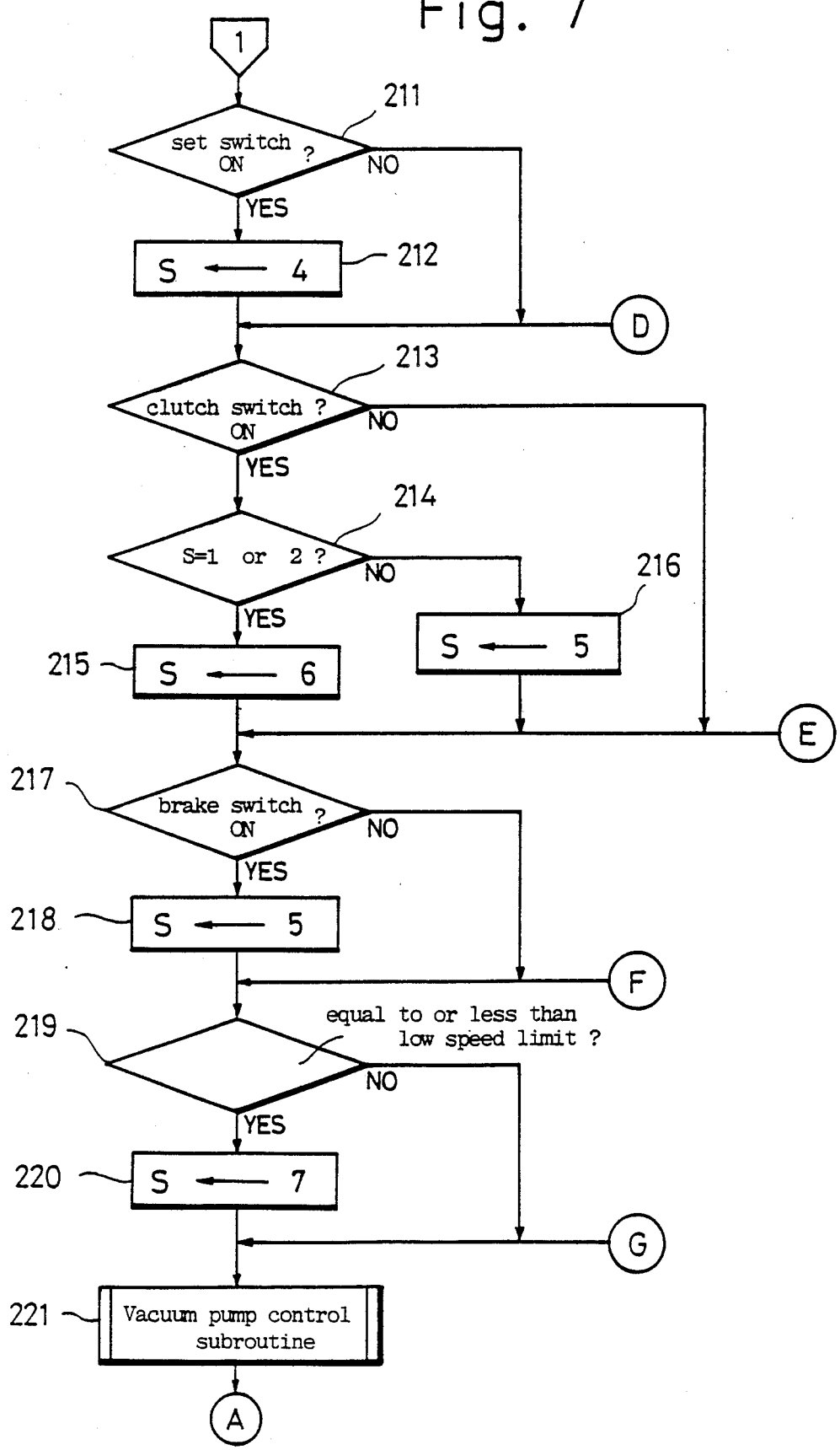
Figure 8:
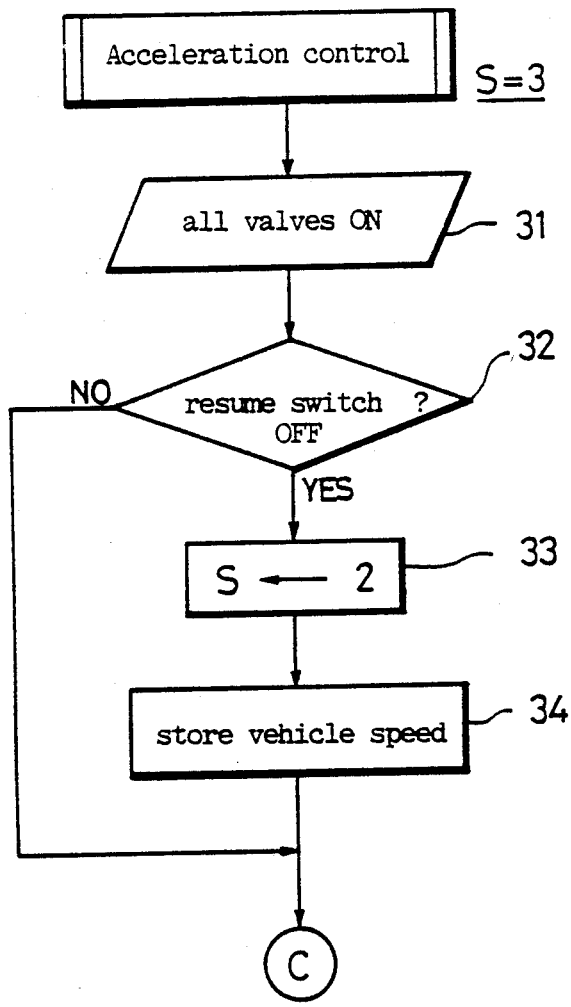
Figure 10:
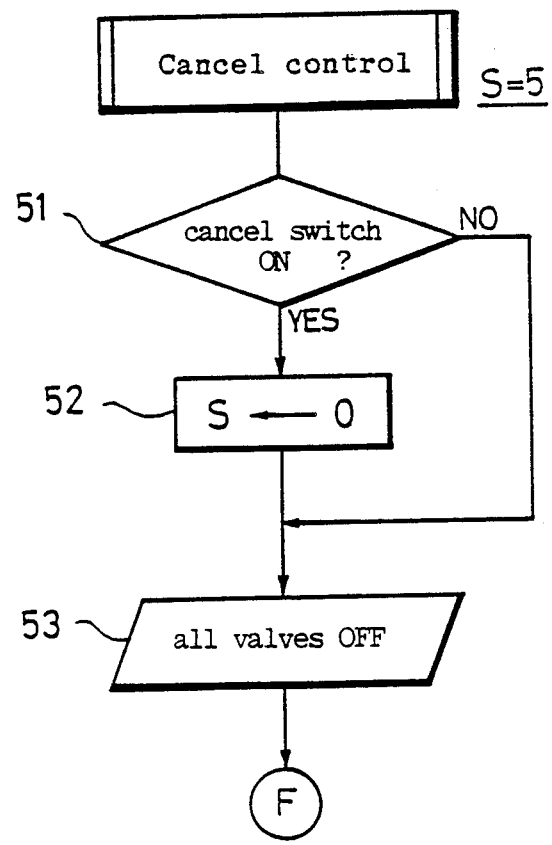
Figure 9:
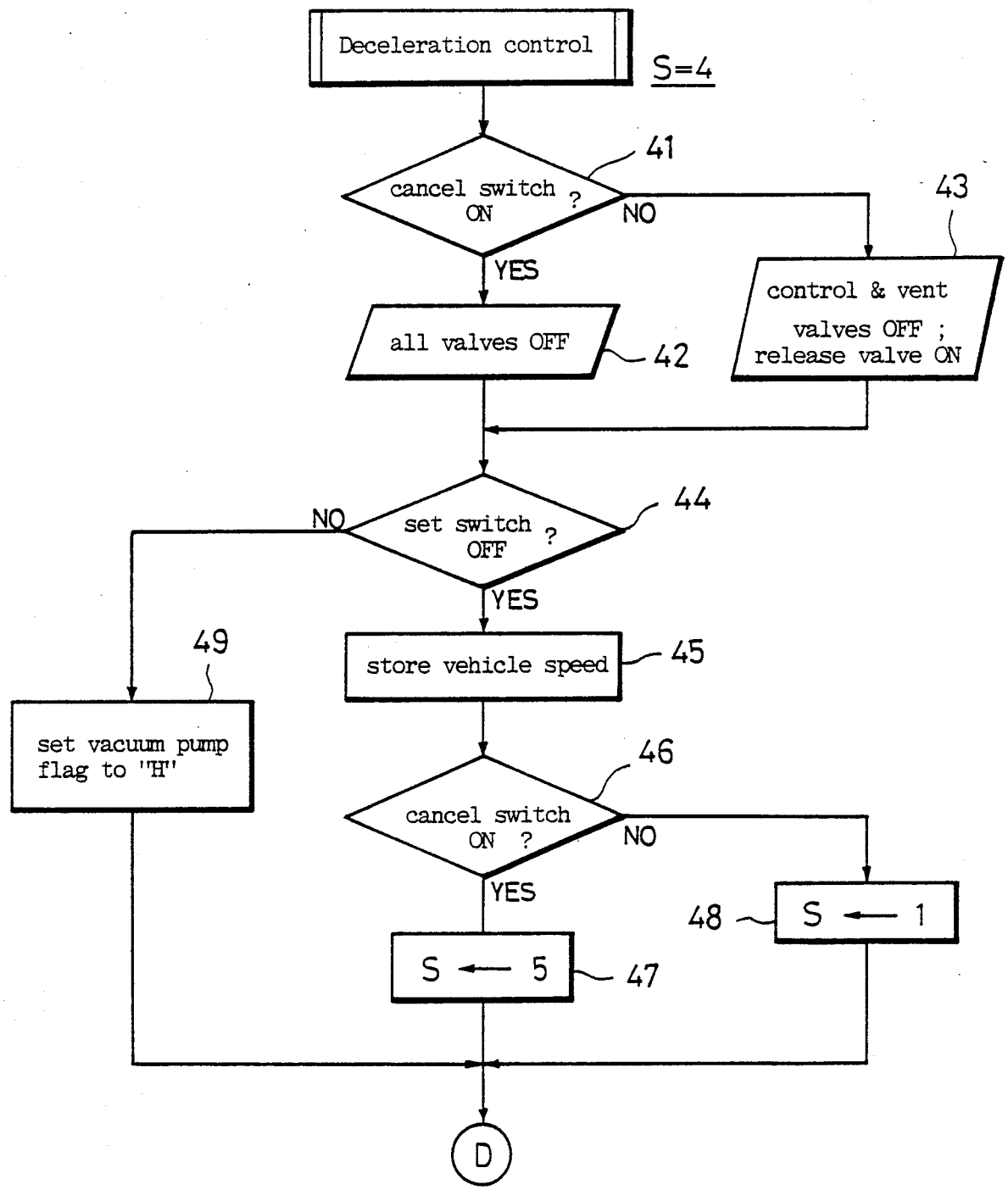
Figure 11:
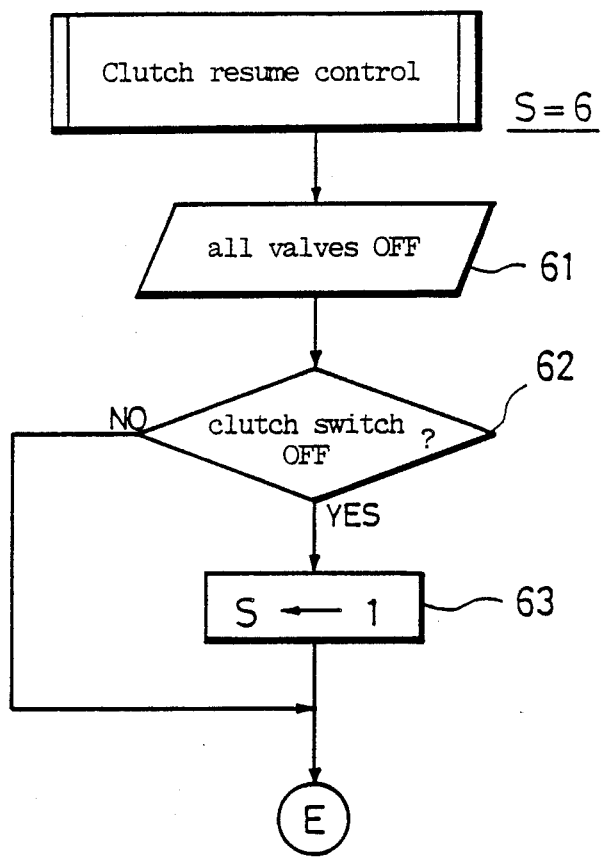
Figure 12:
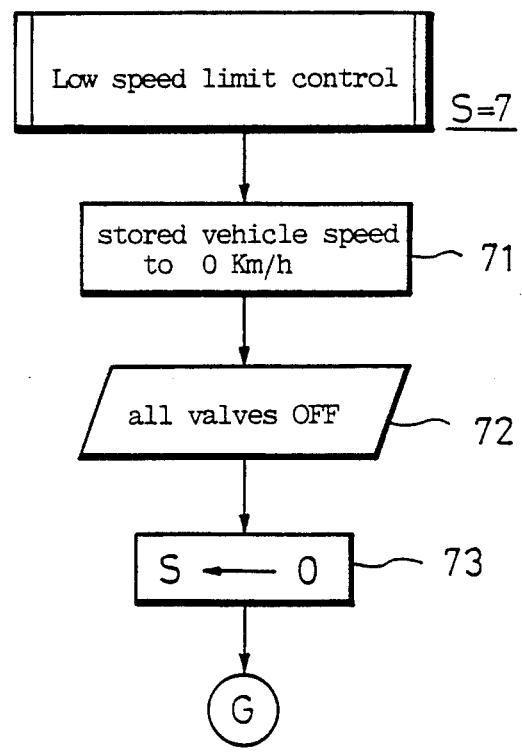

It is also possible to inhibit the constant speed running control mode in the event of occurrence of an abnormality with the brake switches SW6 and SW7 by utilizing a software within the electronic controller CPU. A second embodiment, which is constructed in this manner, is illustrated in FIG. 2. Comparing the arrangements shown in FIGS. 1 and 2, it will be noted that the second embodiment is substantially similar to the first embodiment except that the filters FL1, FL2, FL3, and logical circuits including exclusive OR circuit EOR, AND circuit AND, flipflop FF, and NOT circuit NOT1 are removed and that the pair of brake lamps L1, L2 are replaced by a single brake lamp L with diodes D1, D2, functioning to prevent a reverse flow, interposed therewith. The latter aspect relates to a technique in constructing the circuit arrangement and has no direct bearing with the present invention. However, the former modification is achieved by utilizing a software within the electronic controller CPU which operates to inhibit the constant speed running control mode in the event of occurrence of any abnormality with the brake switches SW6 and SW7.

A control operation by the electronic controller CPU of the second embodiment will now be described with reference to the flow charts shown in FIGS. 3 to 12. Specifically, when the power switch SW1 is turned on, the electronic controller CPU initializes memories and output ports at step M1. At this time, a register S which is used to select a control program to be described later is reset to 0 (the selection of "standby mode control").

Subsequently, the status of various switches connected to individual input ports is read at step M2, and at steps M3 to M11, a flag FS and the register S are set in accordance with the read status of the brake switches SW6 and SW7. The flag FS indicates a normal operation of the brake switches SW6 and SW7 when it is reset (assuming L level), and indicates an abnormal operation of either brake switch SW6 and/or SW7 when it is set (assuming H level).

SW6 off, SW7 off:

The program proceeds through steps M3, M4 and M5, and if the flag FS is set, "5" (selection of "cancel control") is loaded into the register S at step M11. Subsequently, the program proceeds to step M6. However, if the flag FS is reset, the program directly proceeds to step M6 without changing the flag FS and the register S.

SW6 off, SW7 on:

An abnormal operation of the brake switches is occurring. In this instance, the program proceeds through steps M3, M4, M10 and M11, setting the flag FS and loading "5" into the register S. The program then proceeds to step M6.

SW6 on, SW7 off:

An abnormal operation is occurring with the brake switches, and the program proceeds through steps M3, M7, M8 and M11, setting the flag FS and loading "5" into the register S. The program then proceeds to step M6.

SW6 on, SW7 on:

Then both brake switches are operating normally, and the program proceeds through steps M3, M7, M9 and M11, resetting the flag FS and loading "5" into the register S. the program then proceeds to step M6.

At step M6, a control program is selected in accordance the value stored in the register S. If $S = 0$, "standby control" is selected; if $S = 1$, "full on control" is selected; if $S = 2$, "constant speed control" is selected; if $S = 3$, "acceleration control" is selected; if $S = 4$, "deceleration control" is selected; if $S = 5$, "cancel control" is selected; if $S = 6$, "clutch resume control" is selected; and if $S = 7$, "constant speed limit control" is selected for execution. Individual control programs will now be described.

$S = 0$, "Standby mode control"

When this program is selected, the status of the resume switch SW5 is detected to cancel the control system. Initially, the solenoids of all the valves V1 to V3 are deenergized to stop the control over the actuator AC, thus stopping the constant speed running control mode at step 01. The status of the resume switch SW5 is examined at step 02. If this switch is on, the stored vehicle speed (target speed) is examined at step 03, and unless it is equal to 0 km/h (a cleared condition), "1" indicating the selection of "Full on control" is loaded into the register S at step 04. A vacuum pump flag is set which is to operate the vacuum pump BP at step 05 in preparation to the execution of the "Full on control" selected by $S = 1$. When the resume switch SW5 is not on or when the stored vehicle speed is equal to 0 km/h, there occurs no change in the control status S.

S =1; "Full on control"

When this program is selected, a predictive control is performed in order to drive the actuator AC to a given condition rapidly. Specifically, the negative pressure within the negative pressure chamber A1 of the actuator AC may not be sufficient after completing the execution of "deceleration control", "standby control" or "cancel control", and accordingly, a given throttle opening may not be reached immediately by controlling the duty cycle of the control valve V1 and the vent valve V2 by executing "constant speed control" to be described below. For this reason, it is examined whether this program is selected for the first time at step 11, and if it is, the solenoids of all the valves V1 to V3 are energized at step 12, and a "Full on control" period is established at step 13 which is increased in proportion to a vehicle speed. If this program is entered and a full on control period is established at step 11, the full on control period which is established is allowed to pass at step 14. When such period has passed, the valve V1 is initially turned off at step 15, and "2" indicating the "constant speed control" is loaded into the register S at step 16.

S =2; "Constant speed control"

When this program is selected, a constant speed running control is executed utilizing a stored target vehicle speed. A current vehicle speed is derived from a pulse from the reed switch SW2 at step 201, and a duty cycle with which the control valve V1 and the vent valve V2 are to be opened and closed is determined in accordance with a deviation of the current vehicle speed from the target vehicle speed.

Steps 202 to 207 represent steps which are used when the vehicle speed cannot be controlled to the target speed for some reason by controlling the vehicle speed in accordance with the duty cycle. First, if a deviation in the vehicle speed is greater than 15 km/h, the program proceeds from step 205 to step 206 where the solenoid of the valve V3 is deenergized, thus decreasing the negative pressure within the negative pressure chamber A1 of the actuator AC until it becomes equal to the atmospheric pressure, whereupon a control over the throttle valve B2 is terminated. The buzzer is turned on at step 207, annunciating the occurrence of an abnormality. Subsequently when the deviation in the vehicle speed decreases below 10 km/h, the program proceeds from step 202 to step 203 where the solenoid associated with the valve V3 is energized, the buzzer is turned off at step 204, and the valves V1 and V2 are controlled in accordance with respective duty cycles to achieve a constant speed running control at step 208. It is to be noted that a hysteresis is provided in reinitiating the control over the actuator AC during the time the deviation in the vehicle speed increases from 10 km/h at step 202 to 15 km/h at step 205 and during the time the deviation in the vehicle speed decreases from 15 km/h at step 205 to 10 km/h at step 202.

The status of the resume switch SW5 is examined at step 209, and if it is found that this switch remains on for a given time interval (which is assumed to be 0.5 second) or longer, "3" indicating "acceleration control" is loaded into the register S at step 210.

The status of set switch SW4 is examined at step 211, and if it is on, "4" indicating the selection of "deceleration control" is loaded into the register S at step 212. The status of the clutch switch SW3 is examined at step 213, and if this switch is on, the value in the register S is examined at step 214. Since the clutch switch SW3 has the resume function, it is necessary to determine whether this control is entered from either "acceleration control" or "deceleration control". When this control is entered from either of such controls, "6" is loaded into the register S to select the "clutch resume control" at step 215 since either "1" or "2" has been loaded into the register S. Otherwise, "5" to select the cancel function is loaded into the register S at step 216 as the clutch switch SW3 is turned on. At step 217, the status of the brake switches SW6 and SW7 is examined, and if at least one of them is on, "5" indicating the selection of "cancel control" is loaded into the register S at step 218. At step 219, a comparison against a low speed limit is made, and if the current vehicle speed is equal to or less than a given control vehicle speed, "7" is loaded into the register S at step 220, thus inhibiting the constant speed running control. "Vacuum pump control subroutine" is executed at step 221. This subroutine has no direct bearing with the present invention, and therefore will not be described in detail.

S =3; "Acceleration control"

When this program is selected, the vehicle speed is accelerated during the constant speed running control to update the running speed. Initially, the solenoids of all the valves V1 to V3 are energized at step 31 to increase the magnitude of the negative pressure within the negative pressure chamber A1 of the actuator AC. The throttle valve B2 is driven in its opening direction to accelerate the vehicle speed until an off condition of the resume switch SW5 is detected at step 32. When the resume switch SW5 is turned off, "2" indicating the selection of "constant speed control" is loaded into the register S at step 33, and the prevailing vehicle speed is stored in a memory at step 34.

S =4; "Deceleration control"

This program decelerates the vehicle speed during the constant speed running control in order to resume the constant speed running control mode. When the set switch SW4 is turned on during the constant speed running control mode, "4" indicating the selection of "deceleration control" is loaded into the register S. The status of the clutch switch SW3 and the brake switches SW6 and SW7, each having a cancelling function, is examined at step 41, and if at least one of these switches is on, the solenoids of all the valves V1 to V3 is deenergized at step 42 to cease the constant speed running control mode. When none of these switches is on, the solenoids associated with the valves V1 and V2 are deenergized when the solenoid associated with the release valve V3 is energized at step 43. When the supply of a negative pressure to the actuator AC is interrupted in this manner, the throttle valve B2 is gradually closed, allowing the vehicle speed to be decreased in a gradual manner. The status of the set switch SW4 is then examined at step 44. If this switch is on, the pump flag is set to its H level at step 49, but if the switch is off, the prevailing vehicle speed is stored at step 45. The status of the clutch switch SW3 and the brake switches SW6 and SW7, each having the cancelling function, is examined again at step 46. If none of these switches is on, "1" indicating the selection of "full on control" is loaded into the register S at step 48. Thus, the deceleration control is continued as long as the set switch SW4 is on, and the constant speed running control is reinitiated with the vehicle speed which prevails when the set switch SW4 is turned off. If it is found at step 46 that some one of the switches SW3, SW6 and SW7 is on, "5" indicating the selection of "cancel control" is loaded into the register S at step 47.

S =5; "Cancel control"

This program is selected when the clutch switch SW3, the brake switch SW6 and/or SW7 is turned on during the execution of "constant speed control" when the register S contains "2", and terminates the constant speed running control. Accordingly, the status of the clutch switch SW3, the brake switches SW6 and SW7 which have cancelling function is examined at step 51. If either one of these switches is on, "0" is loaded into the register S in preparation to the selection of "standby mode" at step 52, and the solenoids of all the valves V1, V2 and V3 are deenergized at step 53.

S =6; "Clutch resume control"

This program is selected when the clutch switch SW3 is turned on during the execution of "constant speed control" when the register contains "2", and once terminates the constant speed running control and then prepares for the re-entrance into the constant speed running control. Initially, the solenoids of all the valves V1, V2 and V3 are deenergized at step 61. Subsequently when the clutch switch SW3 is detected to be off at step 62, "1" is loaded into the register S at step 63 in preparation to select the "full on control".

S =7; "Low speed limit control"

This program is selected when the vehicle speed is less than a given value during the execution of "constant speed control" in order to cancel the constant speed control and to clear the stored speed. The stored vehicle speed is cleared at step 71, the solenoids of all the valves V1, V2 and V3 are deenergized at step 72, and "0" is loaded into the register S at step 73 in preparation to the selection of "standby mode".

As described, in the vehicle speed control system of the present embodiment, if the brake switches SW6 and SW7 are functioning properly, a particular control is selected in accordance with the value contained in the register S after recognizing that a terminate switch abnormality flag FS, storing the occurrence of a failure with either brake switch SW6 or SW7, thus entering a "standby mode". However, in the event a failure occurs with either brake switch SW6 or SW7, the terminal switch abnormality flag FS is set to store this fact, and "5" is loaded into the register S in preparation to the selection of "cancel control". It will be noted that subsequently the value contained in the register S which is relied upon to determine into individual control programs remains to be "5" to prevent the constant speed control from occurring since the abnormality flag FS cannot be reset until the brake switch SW6 or SW7 resume their proper functioning. However, whenever the failure occurring with either brake switch SW6 or SW7 is removed, the terminate switch abnormality flag FS is reset, enabling the entrance into the constant speed running control mode.

In this second embodiment, an electronic controller CPU inhibits the constant speed control whenever an abnormality in the operation of the brake switch SW6 or SW7 is found until such fail is removed. Accordingly, this can be accommodated for by merely modifying a software used in a normal vehicle speed controlling system, thus eliminating the need to add other electronic components, which may be advantageous in certain application.

Figure 13:
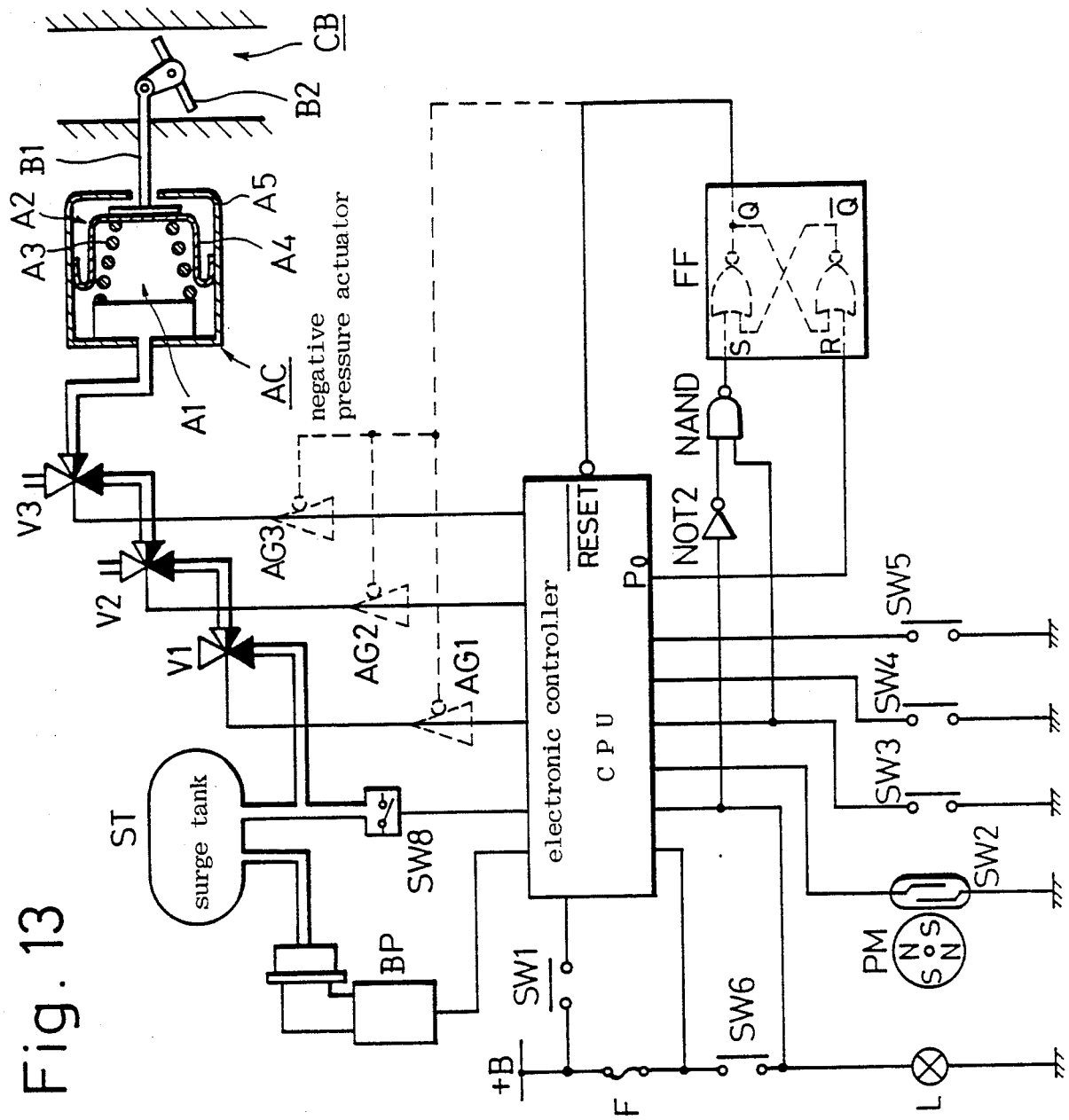
FIG. 13 is a block diagram of a third embodiment of the invention.

FIG. 13 is a block diagram of a constant speed running system according to a third embodiment. As compared with the arrangement shown in FIG. 1, the system of the third embodiment does not utilize the brake switch SW7. In addition, a logical circuit shown in the arrangement of the first embodiment including the filters FL1, FL2 and FL3, exclusive OR circuit EOR, AND circuit AND, fliflop FF and NOT circuit NOT1 is replaced by a different logical circuit comprising NOT circuit NOT2, NAND circuit NAND and flipflop FF. In other respects, the arrangement and functioning is similar to the first embodiment, and accordingly, the ensuing description will be directed to such modifications.

In the arrangement of the third embodiment, the electronic controller CPU includes a terminal RESET, which receives an instruction to stop the control operation, fed from the output terminal Q of the flipflop FF. Thus, when an L level is delivered from the terminal Q of this flipflop as it is reset, its negative edge resets the electronic controller CPU. The flipflop FF represents a set-reset (R-S) flipflop formed by a pair of NOR gates. The flipflop is set by a positive edge of an input applied to its set terminal S to deliver an H level at its output terminal Q, and is reset by a positive edge of an input applied to its reset terminal R to establish an L level at its output terminal Q. An output from NAND circuit NAND is applied to the set terminal S while an output from the output terminal $P_0$ of the electronic control is applied to the reset terminal R of the flipflop FF.

The circuit NAND forms a negated logical product of on/off signal from the brake switch SW6 as inverted by the circuit NOT2 and an on/off signal from the clutch switch SW3. Specifically, if either the brake switch SW6 or clutch switch SW3 is turned on, the circuit NAND delivers an H level to set the flipflop FF. The controller CPU delivers an H level at its output port $P_0$ to reset the flipflop FF whenever a deviation between the current vehicle speed and the target vehicle speed exceeds a given value.

Figure 14:
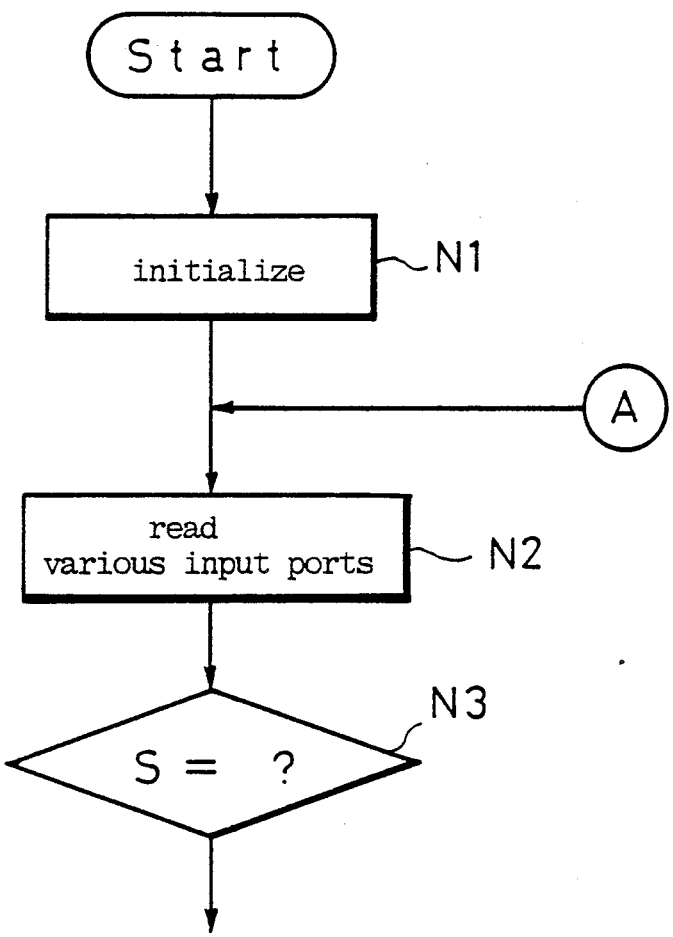
FIGS. 14 and 15 are flow charts illustrating part of the operation by CPU in an electronic control circuit shown in FIG. 13.
Figure 15:
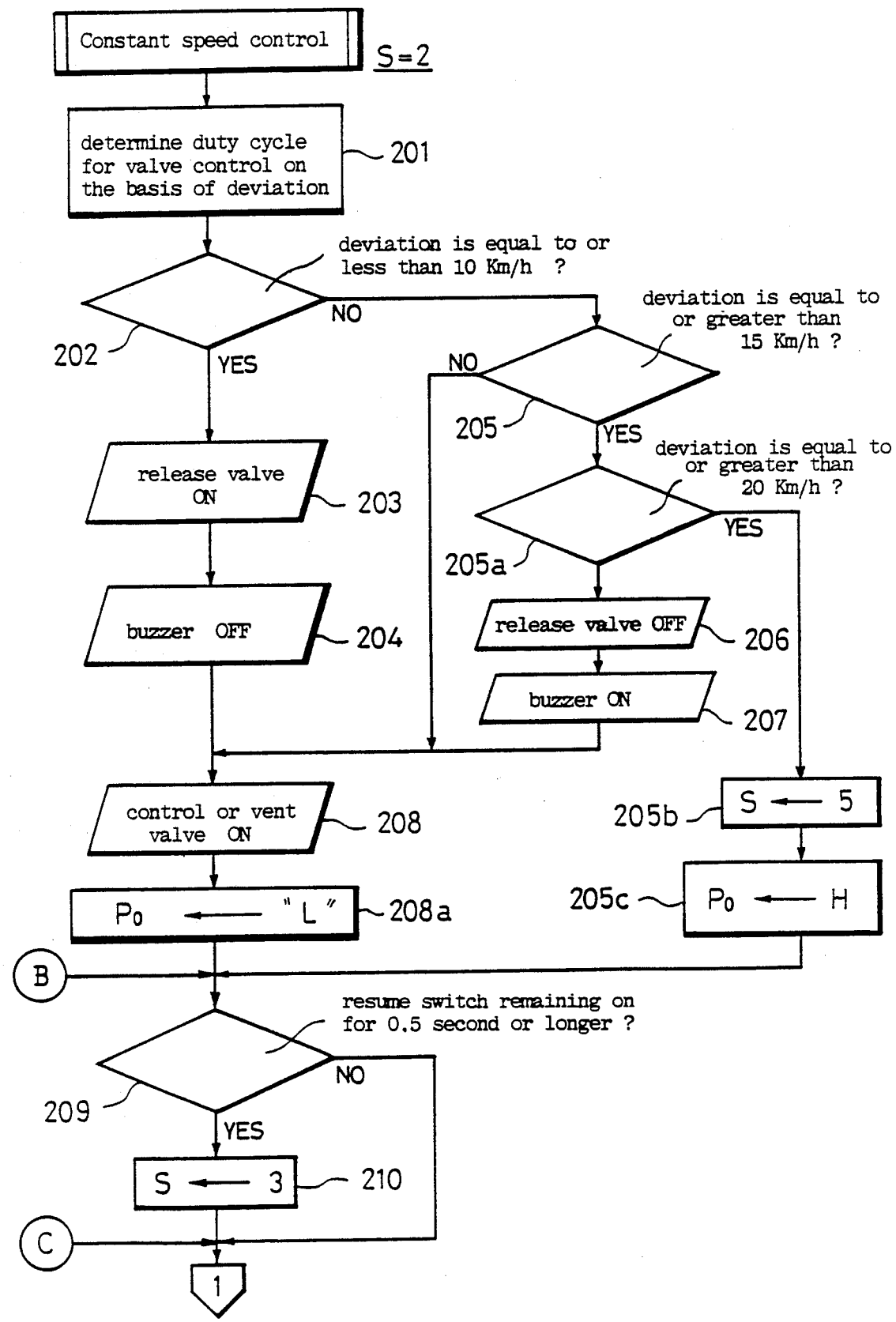

A control operation by the electronic controller CPU used in the third embodiment will now be described with reference to the flow charts shown in FIGS. 14 and 15. Initially, when the power switch SW1 is turned on, the electronic controller CPU initializes its memories and the output ports at step N1 (output port $P_0$ delivering an L level). "0" is loaded into a register S which is used to select a particular control program as will be described later (now "standby mode" is selected).

Subsequently, the status of various switches connected to individual input ports is read at step N2, and a particular program is selected in accordance with the value contained in the register S at step N3. Specifically, "standby mode" is selected if S =0; "Full on control" is selected if S =1; "Constant speed control" is selected if S =2; "Acceleration control" is selected if S =3; "Deceleration control" is selected if S =4; "Cancel control" is selected if S =5; "Clutch resume control" is selected if S =6; and "Constant speed limit control" is selected if S =7 for execution, respectively. These programs essentially correspond to corresponding programs executed by the control operation of the controller CPU in the second embodiment except for part of "constant speed control", which part alone will be described with reference to FIG. 15.

During the "constant speed control" in the third embodiment, a constant speed running control is performed on the basis of a stored target vehicle speed, and if a deviation between a current vehicle speed and the target vehicle speed increases to exceed a given value (which is 20 km/h in the present embodiment) for some reason, the controller CPU clears itself. The current vehicle speed is derived from a pulse supplied by the reed switch SW2, and a duty cycle with which the control valve V1 and the vent valve V2 are opened and closed is determined on the basis of a deviation between the current vehicle speed and the target speed at step 201. Initially, such deviation is examined at step 202. If the deviation is less than 10 km/h, it is determined that the constant speed running control is effectively applied, and accordingly the solenoid of the release valve V3 is energized at step 203, the buzzer is turned off at step 204, and the valves V1 and V2 are subject to a duty cycle control at step 208 in order to execute the constant speed running control. If the deviation is greater than 15 km/h and is less than 20 km/h, the program proceeds to step 206 and subsequent steps where the solenoid of the release valve V3 is initially deenergized to reduce the negative pressure within the negative pressure chamber A1 of the actuator AC until it becomes equal to the atmospheric pressure, thus terminating a control over the throttle valve B2. It is to be noted that a hysteresis is established between settings where the control of the negative pressure actuator AC is resumed during the acceleration from a deviation of 10 km/h to a deviation of 15 km/h at step 205 and during the deceleration of a deviation of 15 km/h at step 205 to a deviation of 10 km/h at step 202.

When the deviation is equal to or greater than 20 km/h, the program proceeds to step 205b where "5" is loaded into the register S to select the "cancel control", and an H level is delivered from the output port P0 at step 205c. When the deviation is less than 20 km/h, the output level of the output port P0 is changed to its L level at step 208a. The subsequent operation occurs in the similar manner as that occurring in the second embodiment mentioned above.

As mentioned, in the constant speed running system of the present embodiment, the controller CPU selects the "cancel control" and delivers an H level from its output port P0 to reset the flipflop FF, the output from the Q terminal of which resets the controller in turn whenever a deviation in the vehicle speed becomes equal to or greater than 20 km/h during the constant speed running control. In this manner, the control operation is interrupted to thereby cancel it. The selection of the "cancel control" represents a fail-safe function, enabling the constant speed running control to be cancelled by way of a software if there occurs any abnormality in the operation of the flipflop FF.

Subsequently when a driver of the vehicle depresses either a brake pedal or clutch pedal to turn the brake switch SW6 or switch SW3 on, the flipflop FF is set to thereby set the controller CPU with the output from Q terminal thereof, thus allowing a control operation to be resumed. However, in the event a failure occurs with the brake switch SW6 and/or switch SW3, which then fails to respond to the depression of either brake pedal or clutch pedal, the controller CPU remains reset, thus preventing the re-entrance of "constant speed running control" under an abnormal condition.

If the flipflop FF is initially reset, it can be set, if the brake pedal SW6 or switch SW3 is functioning properly, as the latter is turned on in response to the depression of either brake pedal or clutch pedal. Accordingly, the controller CPU maintains a normal operation during its constant speed running control mode unless a deviation between the current vehicle speed and the target speed becomes equal to or greater than 20 km/h.

As described, in the arrangement of the third embodiment, the constant speed running control is inhibited by interrupting the control operation by the controller, which is itself reset by an output from the flipflop FF whenenever a deviation becomes equal to or greater than 20 km/h. However, a modification which is similar to that mentioned above in connection with the first embodiment is possible, as indicated by broken lines in FIG. 13 by interposing gates AG1, AG2 and AG3 in the control lines extending to the valves V1, V2 and V3, respectively, to interrupt a control signal, thus substantially inhibiting the constant running speed control. In such instance, an output from the Q terminal of the flipflop FF may be applied to the control input of these gates AG1 to AG3 to close them, thus interrupting an energizing signal which is applied to the solenoid associated with the valves V1 to V3 from the controller CPU whenever the deviation becomes equal to or greater than 20 km/h, by resetting the flipflop FF. Once reset, the flipflop FF cannot be set unless the brake switch SW6 and the clutch switch SW3 operate properly and are turned on in response to the depression to the brake pedal or clutch pedal, whereby the throttle valve B2 is prevented from being driven by a control signal from the controller CPU in the event of occurrence of an abnormality.

It is to be understood that circuit portions and components used to construct the arrangement of the respective embodiments are exemplary only, and can be replaced by various other known circuits and components. By way of example, while the controller CPU delivers an output of H level from its output port P0 to reset the flipflop FF when the deviation in the vehicle speed becomes equal to or greater than 20 km/h during the constant speed running control, this arrangement may be replaced by a combination of an F/V converter, a comparator and a gate circuit. Specifically, the on/off frequency of the switch SW2 may be translated into a voltage by an F/V converter, and the voltage may be fed to a comparator for comparison against a voltage which corresponds to 20 km/h, with an output from the comparator being fed through a gate circuit to the reset terminal R of the flipflop FF. In such instance, the controller CPU enables the gate circuit when the constant speed running control is to be executed. A number of such modifications are contemplated which utilizes the prior art, which need not be specifically listed herein.

The constant speed running control is terminated in response to the brake switch SW6 or SW7 in each of the first and the second embodiment, and in response to the brake switch SW6 or the clutch switch SW3 in the third embodiment, but such control may be terminated by other combinations of switches or by the provisions of a devoted terminate switch. Additionally, a back-up battery may be provided to support the controller CPU and the flipflop FF so that a content of the storage may be retained when the power supply is off, thus enhancing the security against the occurrence of an abnormality.

Thus it will be seen that according to a first aspect of the invention, a plurality of command means are provided which are individually operable to terminate a vehicle speed control mode. The vehicle speed control mode is terminated whenever there is a command from at least one of these command means to terminate such mode. If such command is issued not from all of the command means, the vehicle speed control mode is subsequently inhibited from being established, thus eliminating the inability to terminate the vehicle speed control mode. Security against any failure of such command means which occurs out of time with the periodic inspection or replacement is assured because it is virtually improbable that the plurality of command means, each of which is capable of terminating the vehicle speed control mode, happen to fail simultaneously.

According to a second aspect of the invention, the vehicle speed control mode is terminated in response to a command to terminate such mode or in response to an increase in a difference between a current vehicle speed and a target vehicle speed. When the vehicle speed control mode is terminated in response to an increase in a difference between the current vehicle speed and the target speed, the vehicle speed control mode is inhibited from being subsequently established. This eliminates the inability to terminate the vehicle speed control mode in the event the command means to terminate such mode fails, thus achieving a sufficient security.

What is claimed is:

1. Vehicle speed control system comprising
rotational speed determining means on an input of a drive source for a vehicle for determining the rotational speed of an output shaft of the drive source as a function of position of the rotational speed determining means;
drive means for changing the position of the rotational speed determining means;
speed detecting means for detecting ta running speed of a vehicle;
first command means to establish a vehicle speed control mode;
a plurality of second command means individually capable of terminating the vehicle speed control mode;
control means responsive to a command to establish a vehicle speed control mode from the first command means, to establish a vehicle speed control mode in which the control means determines a target speed and commands the drive means to change the position of the rotational speed determining means so that the running speed coincides with the target speed, and for subsequently terminating the vehicle speed control mode in response to a command from at least one of the plurality of second command means which command the termination of the vehicle speed control mode;
and blocking means being responsive for blocking the vehicle speed control mode from being established, the blocking means responsive to a command to terminate the vehicle speed control mode from not all of, but at least one of the plurality of second command means to block the subsequent establishment of the vehicle speed control mode, the blocking means subsequently permitting the establishment of the vehicle speed control mode when all of the plurality of said second command means are operative to provide a command to terminate the vehicle speed control mode.

2. A vehicle speed control system according to claim 1 in which each of the plurality of second command means command termination of the vehicle speed control mode in response to a depression of a brake pedal.

3. A vehicle speed control system comprising
vehicle speed control means for controlling a running vehicle speed so as to remove a deviation between a current vehicle speed and a target vehicle speed;
control interrupt instruction input means for providing an instruction to interrupt a control by the vehicle speed control means;
first control interrupt signal generating means for generating a first control interrupt signal when the control interrupt instruction input means provides an instruction to interrupt the control;
second control interrupt signal generating means for generating a second control interrupt signal when the control interrupt instruction input means provides an instruction to interrupt the control; and
decision means for storing an abnormality signal in storage means when only one of the first and the second control interrupt signal generating means provides the signal and for clearing the abnormality signal in the storage means when both the first and the second control interrupt signal generating means are operative to provide signals, the stored abnormality signal causing the vehicle speed control means to cease the control of the vehicle.

4. A vehicle speed control system according to claim 3 in which the vehicle speed control means comprises constant speed running control means which maintains a constant vehicle speed.

5. A vehicle speed control system according to claim 3 in which the control interrupt instruction input means comprises a cancel switch which is formed by a switch associated with a pedal.

6. A vehicle speed control system according to claim 5 in which the first and the second control interrupt instruction input means comprises a pair of contacts on a switch associated with one of a brake pedal and a clutch pedal and a cancel switch which are turned on when either one of a brake pedal and a clutch pedal is depressed.

7. A vehicle speed control system according to claim 3 in which the decision means comprises a microcomputer.

* * * * *